US008217807B1

(12) United States Patent
Carrico

(10) Patent No.: US 8,217,807 B1
(45) Date of Patent: Jul. 10, 2012

(54) OPERATIONAL FLIGHT PHASE DETERMINATION AND INDICATION SYSTEM

(75) Inventor: Matthew J. Carrico, Mount Vernon, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 524 days.

(21) Appl. No.: 12/504,524

(22) Filed: Jul. 16, 2009

(51) Int. Cl.
*G01C 21/00* (2006.01)

(52) U.S. Cl. ......... 340/971; 340/945; 340/951; 340/964

(58) Field of Classification Search .................. 340/971, 340/945, 951, 963, 964; 715/859, 860, 771, 715/772; 701/9, 14, 15, 16
See application file for complete search history.

(56) References Cited

U.S. PATENT DOCUMENTS 6,643,580 B1 * 11/2003 Naimer et al. ................ 701/467
6,816,780 B2 * 11/2004 Naimer et al. ................ 701/467
6,892,118 B1 5/2005 Feyereisen
7,191,406 B1 * 3/2007 Barber et al. ................. 715/771
7,272,491 B1 * 9/2007 Berard .......................... 701/467
7,321,318 B2 * 1/2008 Crane et al. ................... 340/971

* cited by examiner

*Primary Examiner* — Toan N Pham
(74) *Attorney, Agent, or Firm* — Donna P. Suchy; Daniel M. Barbieri

(57) ABSTRACT

An operational flight phase determination and indication system for an aircraft includes input/output circuitry for receiving an operational flight phase selector output signal and aircraft sensor signals. A processor is coupled to the input/output circuitry. A flight phase data table is coupled to the processor. The flight phase data table includes a list of the defined operational flight phases for the aircraft. A flight phase transition rules set is coupled to the processor. The flight phase transition rules set includes flight rules for defining flight phase transitions. Program memory and working memory are coupled to the processor. The processor uses input from the input/output circuitry, the flight phase data table, the flight phase transition rules set, the program memory and the working memory to provide an operational mode signal indicating the operational mode of the aircraft. A flight phase selector is coupled to the processor for providing the flight phase selector signal to the processor in accordance with the pilot selected flight phase input. A display indicator driver is coupled to the processor for providing display indicator driver signals to an operational flight phase indicator in accordance with the operational mode signal. The input/output circuitry preferably receives on-board automation systems input.

20 Claims, 5 Drawing Sheets

| Transition To | Condition |
|---|---|
| Pre Flight | (Pilot Selects Pre-Flight) AND (aircraft on ground)<br>-OR-<br>(Cold Start) AND (aircraft on ground) AND (aircraft position on ramp area) AND (ground speed = zero) |
| Taxi-out | (Pilot selects Taxi-Out) AND (aircraft on ground)<br>-OR-<br>(Previous state = Pre-Flight OR De-Ice) AND (aircraft position on surface movement area) AND (not on takeoff runway) |
| Takeoff | (Pilot selects Take-off) OR (Pilot selects Take Off / Go Around)<br>-OR-<br>(Previous state = Taxi Out) AND (aircraft position on takeoff runway) |
| Climb out | (Pilot selects climb-out) AND (aircraft in air)<br>-OR-<br>(Previous state = Takeoff) AND (aircraft in-air) AND (altitude above 400 ft AGL) |
| Cruise | (Pilot selects Cruise) AND (aircraft in air)<br>-OR-<br>(Previous state = Climb out) AND (automation mode = cruise) |
| Descent | (Pilot selects Descent) AND (aircraft In air)<br>-OR-<br>(Previous state = Cruise) AND (automation mode = descent) |
| Approach | (Pilot selects Approach) AND (aircraft In air)<br>-OR-<br>(Previous state = Descent OR Missed Approach) AND (automation mode = Approach) |
| Landing | (Pilot selects Landing) AND (aircraft in air)<br>-OR-<br>(Previous state = Descent) AND (automation mode = landing) |
| Taxi-in | (Pilot selects Taxi-in) AND (aircraft on ground)<br>-OR-<br>(Previous state = Landing) AND (aircraft on surface movement area) AND (not on landing runway) |
| Post Flight | (Pilot selects Post Flight) AND (aircraft on ground)<br>-OR-<br>(Previous state = Taxiin) AND (aircraft on ground) AND (aircraft on ramp area) AND (groundspeed = zero) |
| Manual Override | Pilot selects Manual Override |
| Emergency | Pilot selects Emergency<br>-OR-<br>Automation mode is Emergency |
| De-ice | (Pilot selects De-Ice) and (aircraft on ground)<br>-OR-<br>(Previous state is Taxi-Out) AND (aircraft position on de-ice pad) AND (groundspeed = zero) |
| Missed Approach | (Pilot selects Missed Approach) AND (aircraft is in air)<br>-OR-<br>(Previous mode is Approach) AND (pilot selects TakeOff / Go Around)<br>-OR-<br>(Previous state is Approach) AND (automation mode is Missed Approach) |

FIG. 4

OPERATIONAL FLIGHT PHASE DETERMINATION AND INDICATION SYSTEM

BACKGROUND OF THE INVENTION

1. Field of the Invention

The present invention relates generally to systems for providing operational flight phase indications and more particularly to a system for determining and indicating the flight phase utilizing aircraft sensors, airplane automation modes, and flight crew input.

2. Description of the Related Art

Some avionics functions are dependent on the aircraft's phase of flight. For example, on-board data load is disabled when the aircraft is in-air. A slightly more complex example is the on-board weather radar, which uses a variety of inputs to determine takeoff and landing mode in order to automatically enable the predictive windshear detection function.

Generally today's avionics functions do not determine operational flight phase, but rather determine equipment operating modes using one or more aircraft state inputs and pilot commands to drive pre-defined logic determined at design time. Such methods are not able to account for all the real-time conditions that affect flight phase determination and they are not able to account for the operational intent of the pilot. In addition, current implementations are often federated, meaning each function uses its own inputs and logic, which can lead to flight phase disagreement between systems.

The limitations of the current methods will be a hindrance to the introduction of new flight deck automation, which have increased dependency on the unambiguous and consistent determination of the operational flight phase. Examples of this are Automatic Dependent Surveillance-Broadcast (ADS-B) In applications such as Airport Surface Situation Awareness and the on-board decision aids needed in NextGen mid- and far-term concepts being defined by the Federal Aviation Administration.

Flight mode annunciator systems are commonly used with today's flight management and autoflight systems. These are based on various devices. For example, U.S. Pat. No. 6,892,118, issued to T. L. Feyereisen, entitled Pictographic Mode Awareness Display for Aircraft, discloses a device, method and computer program for generating and displaying graphical displays symbolic of current and available operational modes of instrument systems, such as navigation and autopilot systems. The Feyereisen method includes receiving a signal representative of a current mode of operation of one or more instrument systems, interpreting the current mode of operation signal to determine the current mode of operation, outputting a control signal informing a pictographic representation symbolic of the current mode of operation, and displaying the pictographic representation of the current mode of operation on a display device, such as a cockpit panel display.

An operational flight phase may be defined as the current operational purpose of the flight or ground segment, usually from the perspective of the pilot or operator. Typical operational phases, part of nearly every flight segment, are Pre-flight, Engine Taxi Out, Take-off, Climb-out, Cruise, Descent, Approach, Landing, Taxi-In, Engine Shut-Down, and Post-flight. Additional operational modes can be defined for emergency events or optional operational activities such as de-ice, return-to-service engine checks, ferry flights, etc. It is noted that these operational flight phases are distinct from the avionics system automation modes typically found in flight management systems and autopilot systems. Such systems may define modes such as "altitude hold" or "lateral navigation", however, these modes refer to the mode of the flight management or autopilot system, not the operational intent of the pilot. For example, an autopilot may be commanded by the pilot to a "heading hold" mode to keep the airplane on a pre-determined heading. The autopilot does not 'know' the operational intent of the heading hold mode, which could, for example, be to assist with following air traffic control vectors during final approach, or may be to follow a specific heading direction during cruise flight. As noted above, generally today's avionics functions do not determine the operational phase of flight, but rather they determine equipment mode using one or more aircraft state inputs and/or pilot inputs to drive pre-defined logic determined at design time. Such methods are not able to account for all the real-time conditions that affect flight phase determination. In addition, current implementations are often federated, meaning each function uses its own inputs and logic, which can lead to mode disagreement between systems.

Operator procedures are often based on the operational flight phase. For example, during Pre-flight the flight crew checks the operational status of aircraft systems and configures those systems for the intended operation. In many cases the operational flight phase determines how the aircraft systems are used. For example, when in the takeoff operational flight phase, the parking brake is not set while the engines are brought up to takeoff thrust. However, when performing a return-to-service engine check, the parking brake must be set while the engines are brought up to high thrust.

A deficiency in today's avionics systems is that the system modes as defined by the current state of the art do not take into account the operational flight phase and do not modify their operation based on the operational flight phase. This means the pilot must understand how the intended flight operation affects the overall system operation and command the avionics systems to the proper configuration.

This places a burden on the pilot to understand the objectives of the intended operational flight phase and configure the aircraft systems appropriately. This imposes additional workload on the pilot and in some cases has led to accidents such as unintentional aircraft movement during return-to-service engine checks.

The aforementioned prior art focuses on the modes of the on-board systems. Additionally, the prior art does not address the effect of the higher level operational flight phases on the on-board systems and the high workload placed on the pilot to properly configure the on-board systems appropriately for the intended operation.

SUMMARY OF THE INVENTION

In a first broad aspect, the present invention is an operational flight phase determination and indication system for an aircraft. It includes input/output circuitry for receiving an operational flight phase selector output signal and aircraft sensor signals. A processor is coupled to the input/output circuitry. A flight phase data table is coupled to the processor. The flight phase data table includes a list of the defined operational flight phases for the aircraft. A flight phase transition rules set is coupled to the processor. The flight phase transition rules set includes flight rules for defining flight phase transitions. Program memory and working memory are coupled to the processor. The processor uses input from the input/output circuitry, the flight phase data table, the flight phase transition rules set, the program memory and the working memory to provide an operational mode signal indicating the operational mode of the aircraft. A display indicator driver is coupled to the processor for providing display indicator driver signals to an operational flight phase indicator in accordance with the operational mode signal.

In contrast to the flight mode annunciator commonly used with current flight management and autoflight systems, with the present invention the flight phase determination function is intended to indicate the operational mode of the aircraft, not the mode of the avionics. The present invention uses a combination of aircraft sensors and direct input from the pilot using a selector/indicator to determine the operational flight phase.

BRIEF DESCRIPTION OF THE DRAWINGS

FIG. 4 is a table illustrating an example set of flight phase transition rules.

DETAILED DESCRIPTION OF THE INVENTION

Figure 1:
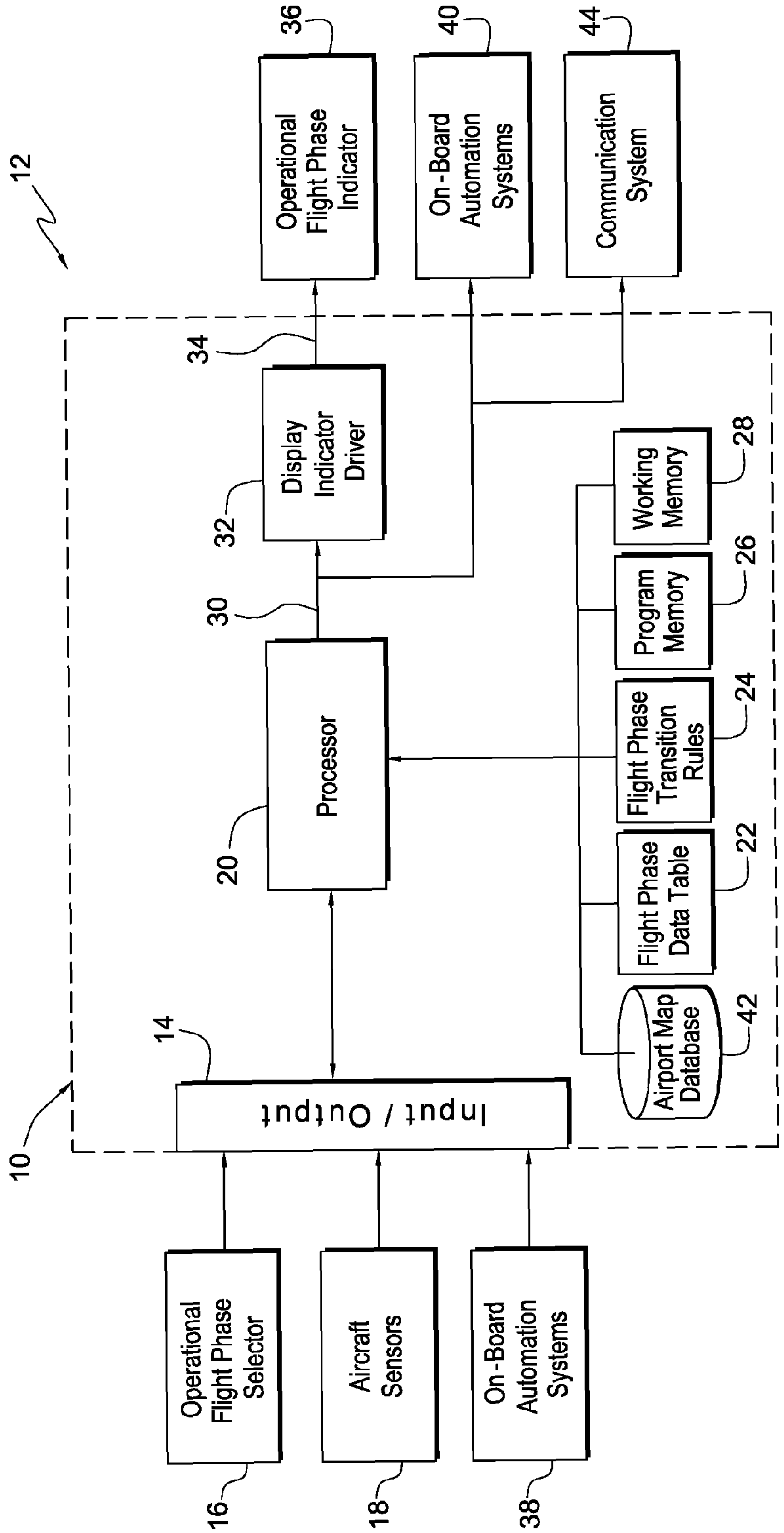
FIG. 1 is a block diagram of the operational flight phase determination and indication system of the present invention.

Referring now to the drawings and the characters of reference marked thereon, FIG. 1 illustrates a preferred embodiment of the operational flight phase determination and indication system of the present invention, designated generally as 10, in an aircraft environment, designated generally as 12. The operational flight phase determination and indication system 10 includes input/output circuitry 14 for receiving an operational flight phase selector output signal from an operational flight phase selector 16 and aircraft sensor signals from aircraft sensors 18. A processor 20 is coupled to the input/output circuitry 14. A flight phase data table 22 is coupled to the processor 20. The flight phase data table 22 includes a list of the defined operational flight phases for the aircraft. A flight phase transition rules set 24 is coupled to the processor 20. The flight phase transition rules set 24 includes flight rules for defining flight phase transitions. Program memory 26 and working memory 28 are coupled to the processor 20. The processor 20 uses input from the input/output circuitry 14, the flight phase data table 22, the flight phase transition rules set 24, the program memory 26 and the working memory 28 to provide an operational mode signal 30 indicating the operational mode of the aircraft. A display indicator driver 32 is coupled to the processor 20 for providing display indicator driver signals 34 to an operational flight phase indicator 36 in accordance with the operational mode signal 30.

The input/output circuitry 14 may be for example, interface circuitry conforming to ARINC 429 or ARINC 624 standards, which are well known in the avionics industry, or standard discrete input and output circuitry conforming to ARINC 700 series equipment standards, which are also well known in the avionics industry. The input/output circuitry 14 may receive data from and transmit data to the operational flight phase selector 16, aircraft sensors 18, and on-board automation systems 38 using a data format such as specified in the ARINC 429, ARINC 624, ARINC 700 series standards or the like.

The operational flight phase selector 16 may be, for example, a simple knob and select pushbutton integrated with a digital text display. The digital display may be the operational flight phase indicator 36 or may be a separate display integrated with the operational flight phase selector 16. Rotating the knob one position to the right or left sends a signal to the processor 20 to sequence to the next (if rotated right) or previous (if rotated left) flight phase available for selection. The processor 20 provides these available flight phases to the input/output circuitry 14 which provides a signal to display the available flight phase on the digital text display integrated with the operational flight phase selector 16. When the desired flight phase is displayed, pushing the integrated selector pushbutton sends a signal to the processor 20 via the input/output circuitry 14 indicating the selected flight phase. Alternatively, the operational flight phase selector may be implemented as a "soft" control using a menu on an interactive display screen, using a data format and user input devices such as specified in the ARINC 661, which is well known in the avionics industry for implementing menu-based user controls.

The aircraft sensors 18 may be, for example, discrete sensors such as strut switches, etc., used to indicate, for example, weight-on-wheels or door closure status, or aircraft navigation sensors such as defined in ARINC 743A-4, ARINC 755-3, and ARINC 706, which are well known sensor equipment standards in the aviation industry.

The processor 20 is a central processing unit (CPU) which may comprise a general purpose aviation computing platform such as described in RTCA DO-255, which is well known in the aviation industry, or a microprocessor such as a PowerPC microprocessor manufactured by International Business Machines Corporation. The CPU of the system 20 may also comprise associated support circuitry as is known in the art.

The flight phase data table 22 which is coupled to the processor 20 is an essential element of the present system. The flight phase data table includes a list of the defined, allowable, operational flight phases for the aircraft. The flight phase categories are ones that the airplane manufacturer and perhaps the operator would like to determine. The flight phase data tables may include for example, the following operational phases: Pre-flight, Push back, Engine start, Ramp taxi out, Taxi out, De-ice, Take off, Climb, Cruise, Descent, Approach, Missed Approach, Landing, Rollout, Taxi off, Taxi in, Ramp taxi in, Engine shutdown, and Post flight. Additional flight phases may be defined for other operations such as Return to service engine check and/or abnormal operations such as Emergency or for pilot override of the flight phase selector such as Manual Override.

The program memory 26 coupled to the processor 20 includes the program instructions for implementing the algorithm for determining the current flight phase from the input/output circuitry 14, the flight phase data table 22, and the flight phase transition rule set 24. The working memory 28 is random access memory (RAM).

The logic for implementing the flight phase determination system may be implemented in a special purpose device, or may be in the form of a stored program executable by a general purpose or special purpose computer. Preferably, the flight phase determination is configured as a general purpose computer system which may be integrated with systems that perform other functions.

Preferably, the input/output circuitry receives aircraft sensor information from the aircraft sensors 18, on-board automation system output signals from on-board automation systems 38, and pilot selected flight phase from the operational flight phase selector 16 for use in determining the flight phase and flight phase transitions. On-board automation systems 38 may be, for example, flight management systems as defined in ARINC 702, an autopilot system, or the like. The processor

20 preferably provides the operational mode signal 30 to the display indicator driver 32 which drives the operational flight phase indicator 36 to indicate the flight phase to the crew. The operational mode signal 30 may also provide the flight phase information to on-board automation systems 40 for use by the on-board automation systems.

The system 10 of the present invention preferably includes an airport map database 42 coupled to the processor which is used to infer the operational phase that the aircraft is in when the airplane is on the ground. The system 10 uses the aircraft sensors 18 to procure current airplane location in terms of latitude/longitude information. The processor 20 compares the latitude/longitude information to the airport map information from database 42. Correlation of the aircraft position with the airport map information can determine, for example, that the aircraft is at a runway, a taxiway, a ramp area, or de-icing pad. Therefore, the system 10 can infer from where the airplane is at and other conditions the operational phase that the aircraft is in. Use of the airport map database is optional. If it is not used the flight phase transition rules 24 give stronger weight to the signals that the system 10 does have and stronger weight to the flight crew input.

The operational mode signal may provide one or more operational modes defined by the user. User defined operational modes are contained in the flight phase database 22 and the rules for transitioning to and from the user defined operational modes are contained in the flight phase transition rules 24 and processed in the processor 20.

Optionally, the operational mode signal 30 may be provided to a communication system 44. The communication system may be a VHF, HF, SATCOM or other data link radio as commonly used in the aviation industry for communicating information to air traffic control, flight operations centers, maintenance operations, other aircraft, or other external entities. Although not specifically shown in this figure, a communication system can provide communication system output signals for use in determining the flight phase and flight phase transitions.

Figure 2:
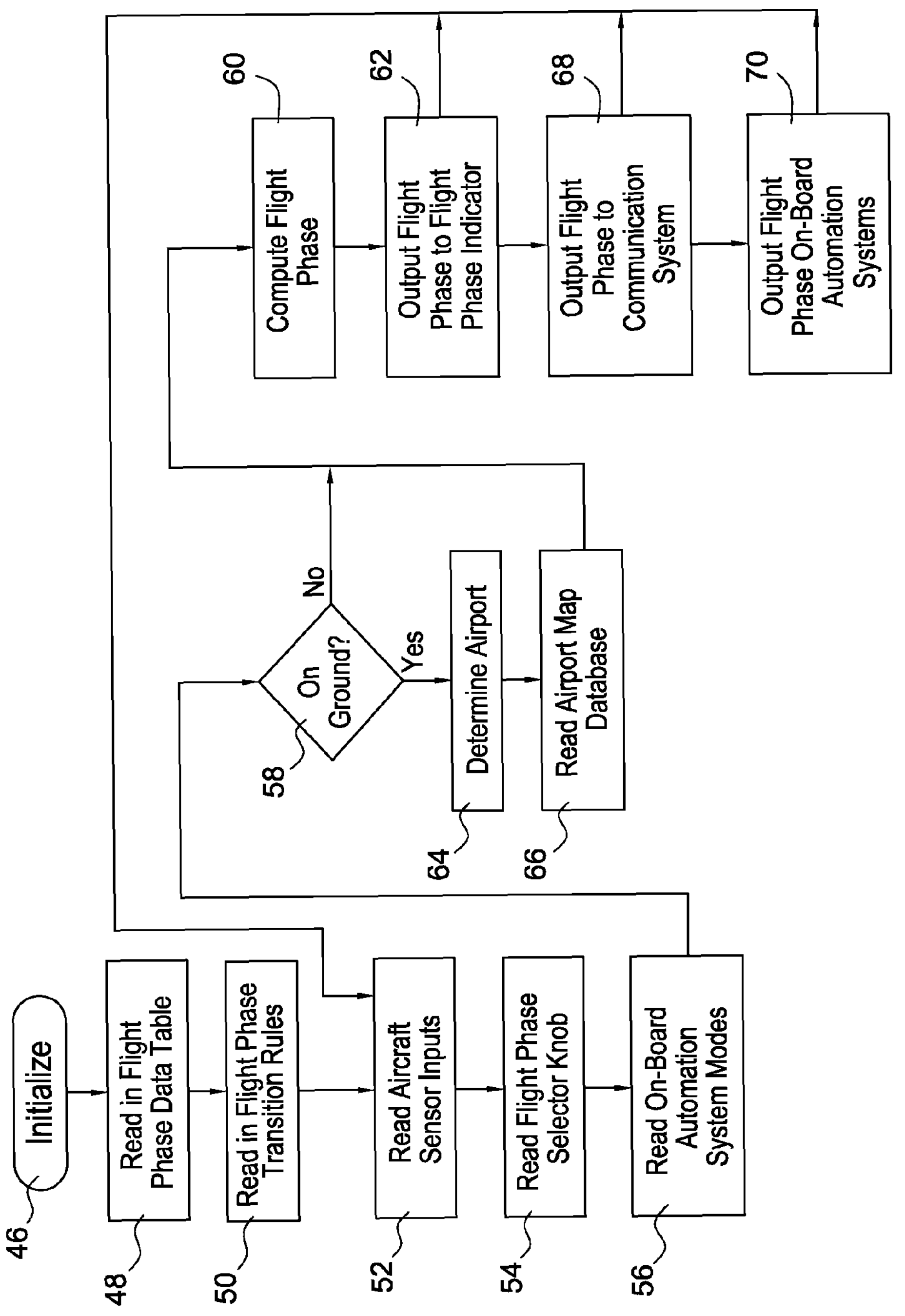
FIG. 2 is a flow diagram showing the processor implementation steps of the operational flight phase determination and indication system.

Referring now to FIG. 2, an example implementation of the algorithm for processor 20 operation is as follows:

The processor 20 is first initialized, as shown by process step 46. It then reads in the flight phase data table (process block 48). The flight phase transition rules table is then read (process block 50). The aircraft sensor signals are read (process block 52). The operational flight phase selector output signal is read (process block 54). On-board automation system output signals from on-board automation systems are read (process block 56). If the airport map database 42 feature is utilized, the processor determines whether the aircraft is on the ground based on the cumulative effects of the previous steps (determining step 58). If the aircraft is not on the ground, the flight phase is computed (process block 60) and the operational mode signal is presented to the flight phase indicator (process block 62). The steps described above beginning with process block 52 are then repeated.

If the aircraft is on the ground, in a preferred embodiment, the processor determines the airport (process block 64) and the airport map database information is read (process block 66).

With other optional features the processor further operates to implement a step of providing the operational mode signal to a communication system (process block 68) and/or providing the operational mode signal to on-board automation systems (process block 70). The communication system (process block 68) provides the operational mode to external users such air traffic control, flight operations centers, and maintenance centers for purposes such as tracking the progress of the flight. The on-board automation (process block 70) can use the operational mode to configure the appropriate system modes for the operational phase.

Figure 3:
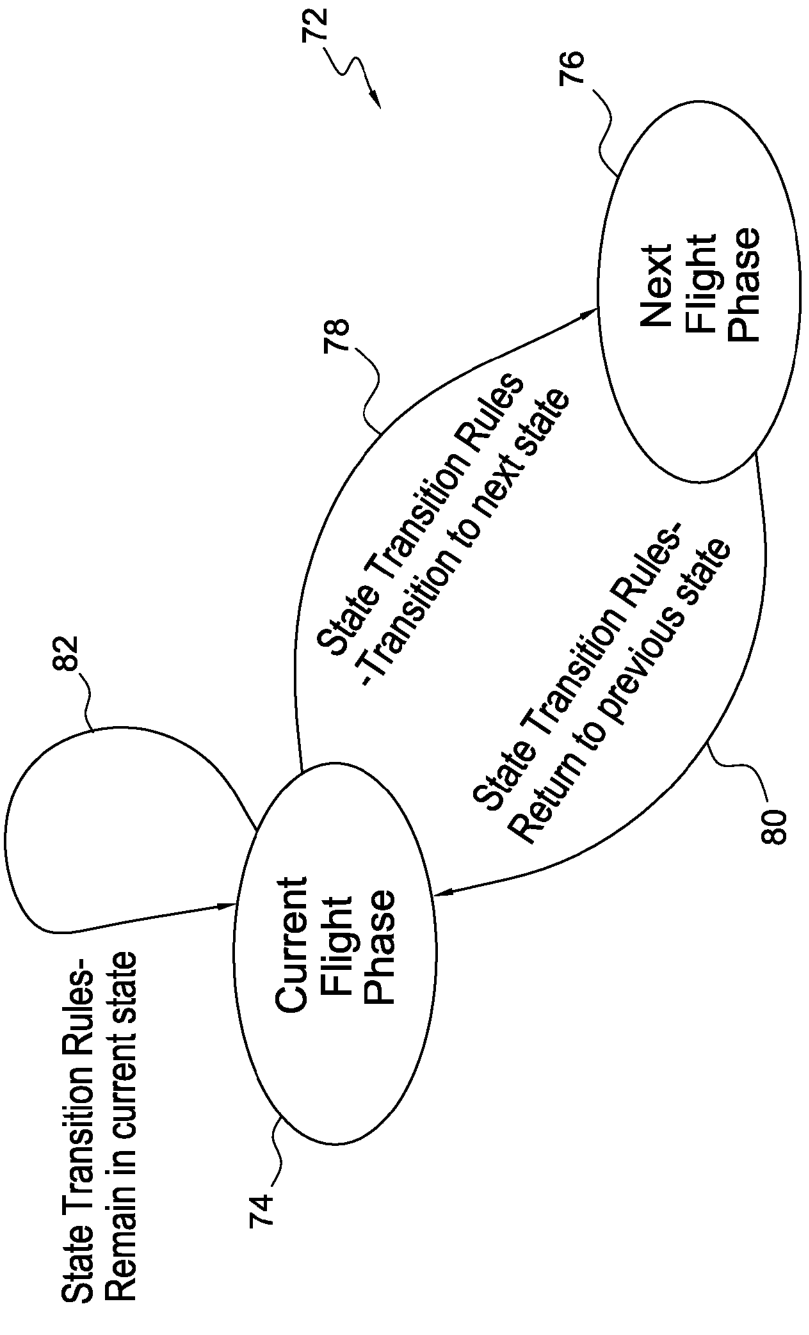
FIG. 3 is a state diagram illustrating the method of computing the flight phase.

Referring now to FIG. 3, the method of computing the flight phase is illustrated, designated generally as 72. In this Figure, the "bubbles" indicate states and the arrows indicate state transitions. While in the present flight phase, as indicated by bubble 74, in order to transition to the next flight phase 76, as indicated by arrow 78, certain conditions must be met, as defined by the state transition rules. This is based on the combination of aircraft inputs and flight phase selector outputs. When the conditions become "true", the system provides an indication that the aircraft is no longer in the current flight phase, there has been a transition to the next flight phase. The next flight phase will either continue to transition to the next one in sequence, or it might return to the current phase, as indicated by arrow 80. It is also possible that the current flight phase will not transition at all, as indicated by arrow 82. In this instance, the criterion for transitioning has not been met. For example, if the airplane is in the pre-flight phase, the next logical state might be engine start. A set of state transition rules are defined that provide the conditions, based on aircraft input and flight phase selector inputs. Additionally, other rules, such as illegal transitions and transitions in which the aircraft can jump a state, can be defined. The flight phase transition rules set may be user defined. The flight phase transition rules may be provided in the form of a table 22, in a preferred embodiment, or as computer instructions contained in program memory 26.

Figure 5:
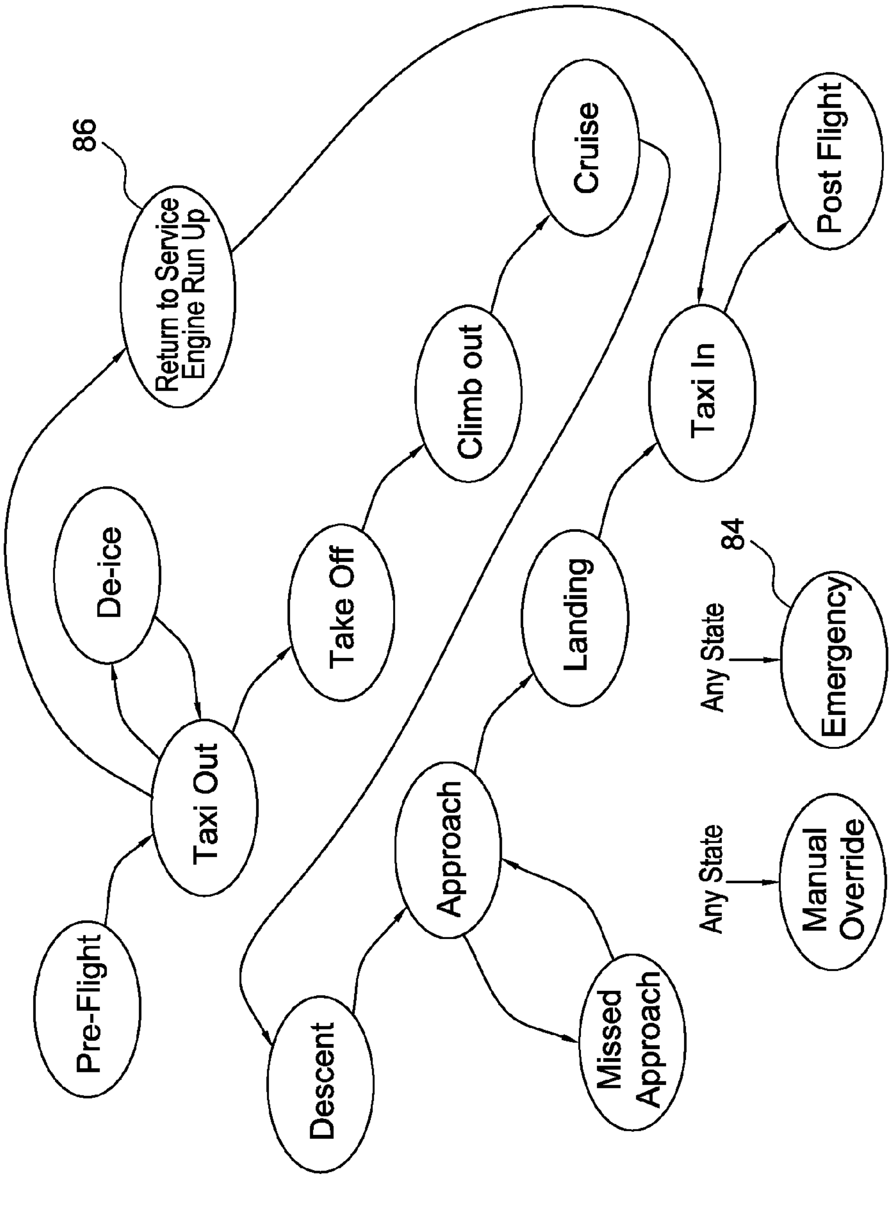
FIG. 5 is a flow diagram illustrating an example set of flight phase state transitions.

Referring now to FIGS. 4 and 5, the method of applying the flight phase transition rules (FIG. 4) to a particular set of operational flight phases (FIG. 5) is illustrated. FIG. 4 defines the flight phase transition rules in the preferred embodiment of a table and using well known logical equations as shown in the right hand column in the table of FIG. 4 to define the states and state transitions. FIG. 5 illustrates the states and allowable state transitions using the form of a state transition diagram, which is well known in the software programming industry. FIG. 5 includes the preferred embodiment of including user-defined states such as Emergency (numeral designation 84) and Return To Service Engine Run-up (numeral designation 86).

The operational flight phase determination and indication system implements the step of computing the flight phase by first obtaining the list of defined operational flight phases from the flight phase data table, next obtaining the flight rules from the flight phase transition rules set and determining whether a flight phase transition is occurring, by obtaining aircraft sensor signals, said operational flight phase selector output signal, and on-board automation system output signals as inputs from the input/output circuitry. The processor then determines the initial operational state by the applying the flight rules based on the current inputs and providing the determined flight phase mode the flight phase indicator, on-board automation, and communication system. The processor continues to monitor the inputs and transitions to the next operational state when the transition rules are satisfied by the inputs.

The solution is not intended to replace the current flight mode annunciator or other avionics or utilities functions that have a need for very specific logic for domain-specific functions (e.g., the aforementioned predictive windshear function, or the like).

The flight mode state transition table will determine allowable state transitions. Some mode determination and transitions will be entirely automatic and indicated to the flight crew for confirmation, while other modes may require crew selection. Conflicts between the inputs, state determination logic, and the state transition table will be indicated to the flight crew for resolution.

The direct involvement of the flight crew is a unique element of this solution. The benefits of this solution are two-fold: the avionics systems have a common indication of the current flight phase and the crew has better mode control and awareness of the on-board automation, with the ability to override the automation if necessary.

Other embodiments and configurations may be devised without departing from the spirit of the invention and the scope of the appended claims.

The invention claimed is:

1. An operational flight phase determination and indication system for an aircraft, comprising:

a) input/output circuitry for receiving an operational flight phase selector output signal and aircraft sensor signals;

b) a processor coupled to said input/output circuitry;

c) a flight phase data table coupled to said processor, said flight phase data table including a list of the defined operational flight phases for the aircraft;

d) a flight phase transition rules set coupled to said processor, said flight phase transition rules set including flight rules for defining flight phase transitions;

e) program memory and working memory coupled to said processor, wherein said processor uses input from said input/output circuitry, said flight phase data table, said flight phase transition rules set, said program memory and said working memory to provide an operational mode signal indicating the operational mode of the aircraft; and, f) a display indicator driver coupled to said processor for providing display indicator driver signals to an operational flight phase indicator in accordance with said operational mode signal.

2. The operational flight phase determination and indication system of claim 1 wherein said input/output circuitry receives on-board automation system output signals for use in determining the flight phase and flight phase transitions, and said processor provides said operational mode signal to an on-board automation system.

3. The operational flight phase determination and indication system of claim 1 further comprising an airport map database coupled to said processor, airport map database information being used to infer the operational phase that the aircraft is in when the airplane is on the ground.

4. The operational flight phase determination and indication system of claim 3 wherein said processor operates to implement the steps comprising:

a) reading said flight phase data table;

b) reading said flight phase transition rules table;

c) reading said aircraft sensor signals;

d) reading said operational flight phase selector output signal;

e) determining from said read flight phase data table, said read flight phase transition rules table, said aircraft sensor signals, and said operational flight phase selector output signal whether the aircraft is on the ground;

f) computing said flight phase from said read flight phase data table, said read flight phase transition rules table, said aircraft sensor signals, and said operational flight phase selector output signal, thus providing said operational mode signal;

g) providing said operational mode signal to a flight phase indicator; and, h) repeating steps c) through f).

5. The operational flight phase determination and indication system of claim 4 wherein said processor further operates to implement a step of providing said operational mode signal to a communication system.

6. The operational flight phase determination and indication system of claim 4 wherein said processor further operates to reading on-board automation system output signals from on-board automation systems prior to determining whether the system is on the ground.

7. The operational flight phase determination and indication system of claim 4 wherein said processor further operates to implement a step of providing said operational mode signal to on-board automation systems.

8. The operational flight phase determination and indication system of claim 4 wherein said processor further operates to implement the steps of: determining the airport and reading said airport map database information if the airplane is on the ground.

9. The operational flight phase determination and indication system of claim 1 wherein said operational mode signal provides an operational mode selected from the group of aircraft modes consisting of: Pre-flight, Push back, Engine start, Ramp taxi out, Taxi out, De-ice, Take off, Climb, Cruise, Descent, Approach, Missed Approach, Landing, Rollout, Taxi off, Taxi in, Ramp taxi in, Engine shutdown, Post flight, Emergency, and Return to service engine check.

10. The operational flight phase determination and indication system of claim 1 wherein said operational mode signal provides an operational mode defined by the manufacturer or operator.

11. The operational flight phase determination and indication system of claim 1 wherein said input/output circuitry receives communication system output signals for use in determining the flight phase and flight phase transitions, and said processor provides said operational mode signal to a communication system.

12. The operational flight phase determination and indication system of claim 1 wherein said processor operates to implement the step of computing said flight phase, by the steps of:

a) obtaining said list of defined operational flight phases from said flight phase data table;

b) obtaining said flight rules from said flight phase transition rules set;

c) determining whether a flight phase transition is occurring by obtaining said aircraft sensor signals, said operational flight phase selector output signal, and on-board automation system output signals as inputs from said input/output circuitry;

d) determining the initial operational state by applying said flight rules based on said inputs; and, e) monitoring said inputs and transitioning to the next operational state when said transition rules are satisfied by the said inputs.

13. The operational flight phase determination and indication system of claim 1 further comprising an operational flight phase selector selecting a desired flight phase and providing said operational flight phase selector output signal in response to said selection.

14. The operational flight phase determination and indication system of claim 1 further comprising an operational flight phase indicator for receiving said display indicator driver signals and providing an indication of the active operational flight phase.

15. An operational flight phase determination and indication system for an aircraft, comprising:

a) an input device for selecting the desired flight phase and providing an operational flight phase selector output signal;

b) processing and generating means for processing said operational flight phase selector output signal and generating a display indicator driver signal, said processing and generating means including a flight phase data table including a list of the defined operational flight phases for the aircraft, and a flight phase transition rules set including flight rules for defining flight phase transitions; and, c) a display device for receiving said display indicator driver signal and indicating the active operational flight phase.

16. The operational flight phase determination and indication system of claim 15 wherein said flight phase selector is a mechanical mechanism comprising a rotary knob or a push-button.

17. The operational flight phase determination and indication system of claim 15 wherein said flight phase selector is a selectable item on a display.

18. The operational flight phase indicator of claim 15 wherein said flight phase indicator is a discrete lamp that illuminates to indicate the active mode.

19. The operational flight phase indicator of claim 15 wherein said flight phase indicator is shown on a display.

20. A method for determining and indicating an operational flight phase of an aircraft, comprising:

a) selecting an operational flight phase and generating an operational flight phase selector output signal in response to said selection;

b) utilizing input/output circuitry for receiving said operational flight phase selector output signal and aircraft sensor signals;

c) providing an operational mode signal indicating the operational mode of the aircraft, using input from said input/output circuitry, a flight phase data table, a flight phase transition rules set, program memory and working memory, wherein, said flight phase data table includes a list of the defined operational flight phases for the aircraft, said flight phase transition rules set include flight rules for defining flight phase transitions;

d) providing display indicator driver signals in accordance with said operational mode signal; and, e) displaying the active operational flight phase of the aircraft in response to said display indicator driver signals.

* * * * *